United States Patent [19]

Bradley et al.

[11] 4,257,735
[45] Mar. 24, 1981

[54] GAS TURBINE ENGINE SEAL AND METHOD FOR MAKING SAME

[75] Inventors: John S. Bradley, Boxford; Alan W. Dix, Danvers, both of Mass.

[73] Assignee: General Electric Company, Lynn, Mass.

[21] Appl. No.: 969,915

[22] Filed: Dec. 15, 1978

[51] Int. Cl.³ .............................................. F01D 11/08
[52] U.S. Cl. ...................................... 415/174; 277/53
[58] Field of Search ........................... 415/1, 174, 172; 277/53, 54, 57

[56] References Cited

U.S. PATENT DOCUMENTS

| | | | |
|---|---|---|---|
| 2,840,343 | 6/1958 | Brandt et al. | 415/174 |
| 3,092,306 | 6/1963 | Eder | 415/219 R |
| 3,346,175 | 10/1967 | Wiles | 415/174 X |
| 3,575,427 | 4/1971 | Lapac et al. | 277/96 |
| 3,701,536 | 10/1972 | Matthews et al. | 277/56 |
| 3,825,364 | 7/1974 | Halila et al. | 415/116 |
| 3,836,156 | 9/1974 | Dunthorne | 277/53 |
| 4,083,650 | 4/1978 | Zboril | 415/174 |
| 4,135,851 | 1/1979 | Bill et al. | 415/174 |
| 4,139,376 | 2/1979 | Erickson et al. | 75/229 |
| 4,149,823 | 4/1979 | Zboril | 415/1 |

OTHER PUBLICATIONS

NASA Tech. Memo TM-X-73650 Apr. 1977.

*Primary Examiner*—Everette A. Powell, Jr.
*Attorney, Agent, or Firm*—Henry J. Policinski; Derek P. Lawrence; Donald W. Walk

[57] ABSTRACT

A seal and method for making same is provided for use in a gas turbine engine. The seal includes a composite article having a substrate of sintered metallic fibers with an apparent density within the range of 14.0% to 22.5%. The substrate comprises a network of interconnected pores and metallic bonds at points of contact between fibers. The substrate further includes an external face having surface pores communicating with the network of pores. A thin film barrier surface layer, impervious to the passage of fluid, is disposed on the external face of the substrate and fills the surface pores.

12 Claims, 3 Drawing Figures

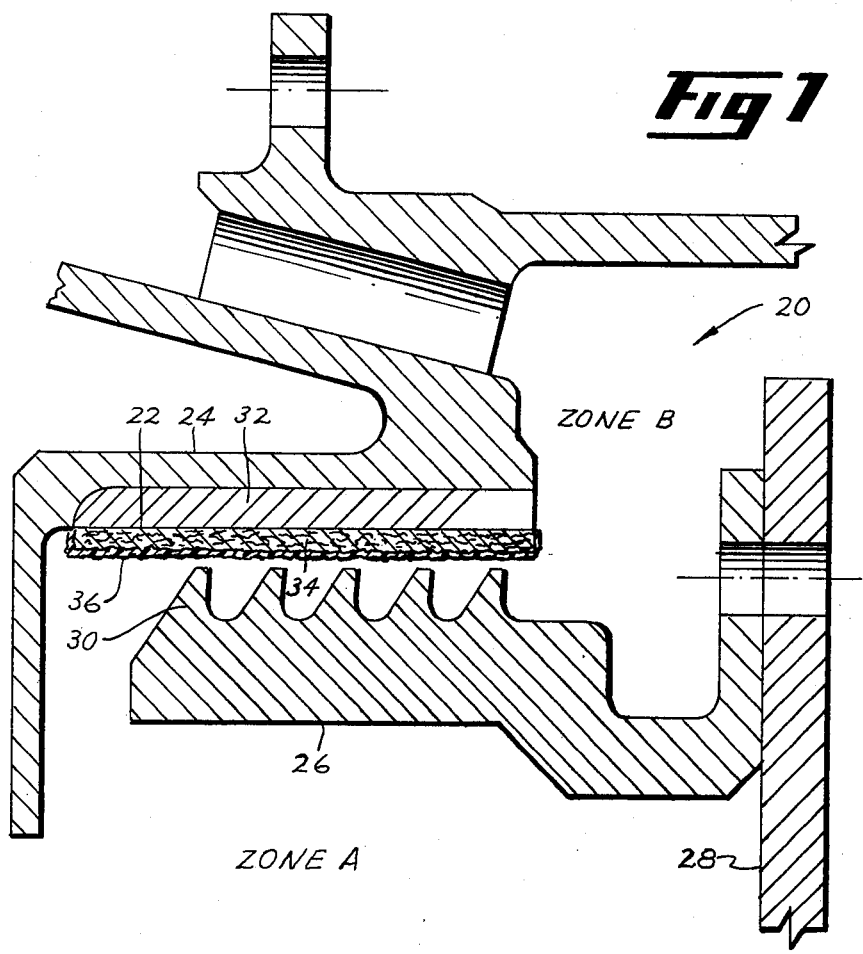
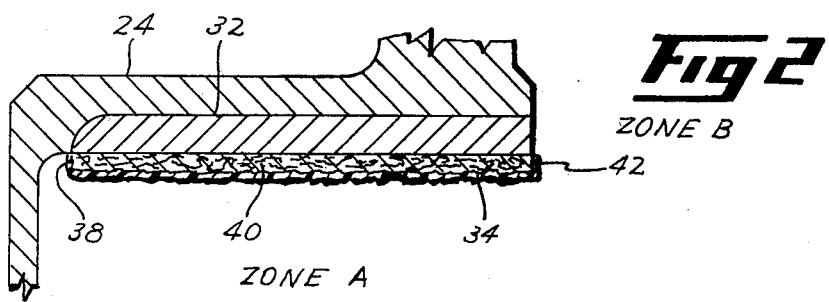
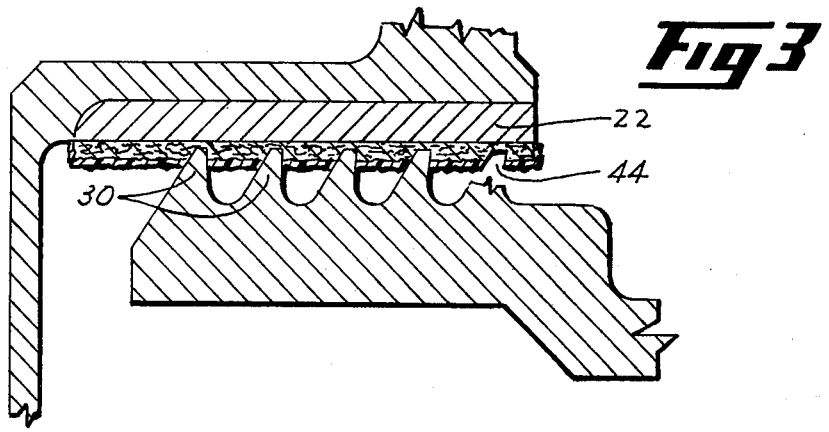

GAS TURBINE ENGINE SEAL AND METHOD FOR MAKING SAME

BACKGROUND OF THE INVENTION

This invention relates to a composite article for use in a gas turbine engine, and more particularly to a method and apparatus providing a sealing arrangement suitable for use in the engine.

The efficient operation of a gas turbine engine depends upon a number of factors, not the least important of which is minimal leakage of gaseous fluid between various rotating and non-rotating elements of the engine. By way of example, leakage of air may occur between a rotating engine shaft and an adjacent portion of the stationary engine housing.

The use of labyrinth type seals to reduce leakage between rotating and non-rotating engine components is well-known in the art. Seal arrangements of this type typically utilize a series of sequentially arranged and closely spaced rotating knife-like edges. The knife-like edges are disposed closely adjacent to a facing material mounted on a stationary element of the engine and under engine operating conditions, the thermal expansion properties and the centrifugal forces acting on the sealing arrangement cause the knife-like edges of the rotating element to contact the stationary face element, penetrate the surface thereof and cut a groove therein. Under operating conditions, the knife-like edges rotate within the aforementioned grooves and hence leakage of air past the edges and the grooves is greatly inhibited and in most instances eliminated.

In seals of the type described, the facing material is of critical importance and must exhibit a number of acceptable physical characteristics. By way of example, the facing material must be resistant to erosion by particles entrained in the air or gas stream flowing through the engine at a high velocity. However, the facing material must not be abrasive to the extent that it wears away the knife-like edges forming part of the sealing arrangement. The facing material must have thermal expansion characteristics compatible with the stationary element to which it is bonded to insure against separation under high temperature conditions. In many instances, since modern day gas turbine engines utilize metallic elements having low coefficients of expansion, the facing element must have a low coefficient of expansion or a low modulus of elasticity. Finally, the facing material must be compatible with the high temperatures found in a typical seal location of a gas turbine engine. In some instances, these temperatures may range from 600° to 1000° Fahrenheit.

One particular facing material heretofore used in prior art sealing arrangements which has proven to be generally satisfactory is comprised of fibers of metal formed so as to exhibit a mat or felt-like construction. More specifically, this material is constructed by sintering a matrix of randomly oriented metallic fibers at a high temperature and at a reduced atmosphere to form a completely interlocked structure of metallic fibers having metallic bonds at all fiber contact points. The sintered material is further characterized by a bulk or apparent density substantially less than the density of the fibers themselves. The low density of sintered fiber metal materials is approximately in the range of 14% to 30% and hence these materials are differentiated from sintered powdered metals which have a density in excess of 30%.

Fiber metals of the type heretofore described have proved to be particularly well suited for use as face seals in aircraft gas turbine engines. Since such face seals include metal as a component, the seal exhibits the strength, rigidity and ruggedness necessary to withstand the rigors associated with a gas turbine engine. Furthermore, low apparent density of fiber metal seals is a characteristic which provides for compatibility between the face seal and the knife-edged tooth. More specifically, since the aforementioned fiber metal compact is comprised of a continuous metallic lattice disposed within a network of interconnected pores, the face seal is both slightly resilient and crushable and abradable. This construction permits rubbing contact between the face seal and a rotating knife-edged tooth to occur without excessive seal wear. Upon contact with a knife-edged tooth the pores of the face material adjacent to the contact point between the seal and the tooth collapse locally. This action reduces the contact force between the seal and the tooth. Additionally, since the face seal is only partially comprised of metallic elements, the remaining portion being a network of interconnected pores, the knife-edged tooth is only in minimal contact with the metallic elements. Since the metallic elements are primarily responsible for wear of the tooth, the face seal comprised of fibers of metal as hereinbefore set forth is well adapted to promote maximum life of the seal tooth.

While fiber metal face seals of the type described have generally proven to reduce leakage between zones in gas turbine engines they have not proven to be totally satisfactory. More specifically, while the interconnected network of pores in the material is responsible for the favorable wear patterns between the face seal and the tooth, the network permits the passage of air through the face seal material itself. Since even small amounts of air leakage may have a significant effect upon the performance of a modern day gas turbine engine, the interconnected porosity associated with sintered fiber metals face seals is a significant shortcoming. The present invention principally addresses this shortcoming without introducing alterations into the seal which would unfavorably affect the compatibility between the face seal and the rotating teeth.

Accordingly it is a principle object of the present invention to provide a new and useful material for use in a sealing arrangement in a gas turbine engine.

It is another object of the present invention to provide a face seal which is essentially impervious to the passage of air therethrough.

SUMMARY OF THE INVENTION

Briefly stated, these and other objects of the present invention which will become apparent from the following detailed description and accompanying drawings are accomplished by the present invention which, in one form, provides a composite article for use in a seal in a gas turbine engine wherein the article includes a substrate of sintered metallic fibers and having an apparent density within the range of 14.0% to 22.5%. The substrate comprises a network of interconnected pores and metallic bonds at points of contact between fibers. The substrate further includes an external face having surface pores communicating with the network of pores. A thin film barrier surface layer impervious to the passage of fluid is disposed on the external face of the substrate and fills the surface pores. The thin film surface layer may be comprised of a silicone based resin and a metallic fiber. The surface layer may be first initially oven cured and then subsequently transformed to a second state in response to a temperature in the engine.

DESCRIPTION OF THE DRAWINGS

While the specifications concludes with claims particularly pointing out and distinctly claiming the subject matter comprising the present invention, the invention will become more fully understood from the following description of the preferred embodiments which are given by way of example with the accompanying drawings wherein:

FIG. 1 is a schematic cross-sectional view of the seal comprising the present invention disposed between two zones in a typical fluid environment of a gas turbine engine.

FIG. 2 is an enlarged schematic cross-sectional view of the face seal shown in FIG. 1.

FIG. 3 is an enlarged schematic cross-sectional view of a portion of the sealing arrangement shown in FIG. 1 and depicting rotating seal teeth in engagement with a face seal.

DESCRIPTION OF THE PREFERRED EMBODIMENT

Referring now to FIG. 1, a schematic cross-sectional view of a sealing arrangement including the present invention is depicted generally at 20. Sealing arrangement 20 obstructs the passage of fluid between zone A and zone B in a manner hereinafter to be described and may be disposed at any number of appropriate locations in a gas turbine engine where it is desirable to prevent the passage of fluid from a first zone of higher pressure to a second zone of lower pressure.

Sealing arrangement 20 is generally comprised of a composite article or face seal 22 secured to a stationary non-rotating engine component 24 and of a rotating edge portion 26 secured to a rotating engine component 28. Rotating portion 26 includes a plurality of knife-edged teeth 30 spaced from each other and disposed in immediate proximity to face seal 22. The principles of operation of a labyrinth type sealing arrangement wherein a plurality of rotating teeth cooperate with a stationary face seal are well-known in the art and hence a detailed explanation of such principles is deemed to be unnecessary for purposes of understanding the present invention. Generally, however, in gas turbine engines a very slight clearance exists between the seal teeth and the face seal when the engine is not in operation. When the engine is operating the high temperature and rotational speed of the engine cause the rotating seal teeth to contact the stationary face seal and form a permanent circumferentially extending groove therein. During engine operation the teeth reside and rotate within the grooves to form a seal against the passage of fluid.

Composite face seal 22 is comprised of backing ring 32, substrate layer 34 and thin film surface layer 36. Backing ring 32 is secured to stationary component 24 by conventional means such as brazing, welding or interference fit and is provided to permit composite seal 22 to be embodied in a sub-assembly form for ease of installation of seal 22 into the stationary component 24 and the gas turbine engine. Substrate layer 34 is bonded, or otherwise affixed, to backing ring 32, and is sandwiched between backing ring 32 and surface layer 36.

Substrate layer 34 is constructed of randomly oriented metal fibers sintered under heat in a reduced atmosphere to yield a compacted material characterized by metallic bonds at all fiber contact points and an interconnected network of pores. While it is possible to produce fiber metal compacts from fibers having a mean diameter within the range 0.00010 inches to 0.010 inches, fiber metal compacts are particularly suitable for use as face seals in gas turbine engines if the fibers have a mean diameter within the range 0.00016 inches to 0.00032. Additionally, by way of example, metal alloy fibers having the following composition have been found to be particularly well adapted for use in forming a compact suitable as a face seal in gas turbine engines:

| Carbon | 0.30 Max | Cobalt | 0.50–2.50 |
|---|---|---|---|
| Manganese | 1.00 Max | Molybdenum | 8.00–10.00 |
| Silicon | 1.00 Max | Tungsten | 0.20–1.00 |
| Phosphorus | 0.040 Max | Iron | 17.00–20.00 |
| Sulfur | 0.30 Max | Boron | 0.010 Max |
| Chromium | 20.50–23.00 | Nickel | Remainder |

In order for a fiber metal compact to be suitable for use as a face seal in a gas turbine engine the compact should have a number of physical properties within specified ranges. The percent density should be within the range of 14.0% to 22.5% and preferably within the range 16.0% to 21.5% where percent density is calculated in accordance with the following formula:

$$\text{Percent Density} = \frac{W}{1 \times w \times t \times 16.4 \times D} \times 100$$

where:
W = weight in grams
1 = length in inches
w = width in inches
t = thickness in inches
16.4 = cubic centimeters per cubic inch
D = density of the metal fiber in grams per cubic centimeter In addition to having a density within the range prescribed above, a fiber metal compact typically should have a tensile strength within the range of 650 psi to 2200 psi as determined in accordance with the American Society for Testing and Materials specification ASTM E8. The minimum Shore DO hardness of the fiber metal compact typically should be within the range 75–80 as determined in accordance with specification ASTM D2240 with the following modifications: a Type DO Shore Durometer should be used with a 0.0937 inch sphere indentor and a 10 pound mainspring; test panels should be strips cut to the dimensions established in ASTME8; the test procedure may use a material which is less than 0.12 inches in thickness.

It has been found that fiber metal compacts exhibiting physical properties within the ranges hereinbefore specified are well suited for particular use as face seals in labyrinth-type sealing arrangements found in gas turbine engines. With a density in the range specified, the abrasivity of the face seal will be sufficiently low to avoid significant wear of the rotating seal teeth. Low wear of teeth 30 is affected since the major portion of the compact is comprised of interconnected pores interspersed amongst the metallic lattice. Hence, a knife-edged tooth in rubbing contact with the compact is primarily in contact with the pore network and in minimal contact with the wear producing metallic fibers of the compact. With a hardness in the range specified, the fiber metal compact exhibits sufficient resiliency or crushability to reduce the contact force between the teeth and the compact. Hence, better tooth wear characteristics are achieved. With a tensile strength in the range specified, the compact exhibits the necessary strength to endure in the gas turbine engine environment.

Substrate 34, comprised of fiber metals and having the physical properties within the ranges described above, will exhibit a significant degree of interconnected porosity. Since percent porosity is equal to 100 minus the apparent density, compacts within a density range of 14.0% to 22.5% will exhibit a porosity within a range of 86.0% to 77.5%. Hence, significant leakage of fluid through the interconnected pores of the substrate 34 may occur and hence significant losses in engine performance may obtain.

Referring now to FIG. 2, which depicts an enlarged schematic cross-sectional view of a portion of the stationary seal elements shown in FIG. 1, it is observed that substrate 34 includes three exterior faces 38, 40 and 42 which, but for the presence of surface layer 36, would be exposed to fluid in zones A and B. External faces 38, 40 and 42 include surface pores which would be in fluid communication with the aforementioned porous network. Hence faces 38, 40 and 42 could provide access by which gaseous fluid may enter and flow through the porous network in substrate 34. By way of example fluid may enter the porous network through surface pores in faces 38 or 40 and thence flow through the substrate 34 to exit through the surface pores of face 42. In order to prevent the leakage of fluid through substrate 34, thin film surface layer 36 is bonded to exterior faces 38, 40 and 42 and serves to fill and infiltrate the surface pores and to provide a thin filmed barrier surface layer impervious to the passage of fluid. Hence, by sealing and filling the surface pores in this manner, fluid is prevented from passing through the porous network of the fiber metal substrate 34.

Since thin film surface layer 36 will be in engagement in rubbing contact with seal teeth 30, consideration must be given to the wear inducing properties of layer 36. Additionally, since layer 36 will be exposed to particles entrained in the gaseous fluid in zones A and B it must be resistant to erosion by the particles. The present invention provides for a thin film barrier surface layer 36 comprised of a material which produces little wearing of teeth 30 and yet is highly erosion resistant. More specifically, the present invention provides for a silicone based resin in combination with a particulate metal, metal alloy or metal oxide filler. This combination is particularly suitable for achieving low wear inducing characteristics and good erosion resistant properties. Aluminum silicone material manufactured and commercially sold by the General Electric Company and identified as "Aluminum Silicone G.E. No. 86009" has proved to be well-adapted to meet the objects of this invention when applied to fiber metal substrate 34 in a manner hereinafter to be described. The term aluminum silicone when used hereinafter in the description of this preferred embodiment shall be a reference to the commercial product identified above.

Aluminum silicone is applied to those surfaces of fiber metal substrate 34 which would otherwise be exposed to fluid in zones A and B. The aluminum silicone may be applied either as a spray or by brush and should have a viscosity of 32 or 33 seconds as measured with a Zahn No. 1 cup at 70° to 80° Fahrenheit. Upon application at this viscosity, the aluminum silicone infiltrates and fills the surface pores of fiber metal substrate 34. After the spray or brush application, any excess aluminum silicone may be gently wiped away from the surface of substrate 34. The substrate 34 with the aluminum silicone applied as indicated is then air dried for a minimum of 30 minutes at ambient temperature and thence initially or partially oven cured at a temperature within the range of 350° to 550° F. for a period of 1-3 hours. After oven curing of the composite in this manner, layer 36 will be comprised of a silicone based polymer having long chains of hydrocarbons. This polymerized or first chemical state promotes retention of the aluminum silicone within the surface pores of substrate 34. Hence, thin film surface layer 36, essentially comprised of a silicone hydrocarbon infiltrating and filling the surface pores of the fiber metal matrix will be firmly attached to substrate 34. The surface layer 36 should be applied in the aforementioned manner in a infiltration thickness, within the range of 0.0005 inches to 0.020 inches to be effective as a barrier impervious to the passage of fluid.

It should be noted that for the sake of simplicity and facilitating the illustration of the present invention, the figures in the drawings depict surface layer 36 as residing wholly on the surface of fiber metal substrate 34 and do not depict the infiltration mechanism. However, it should be understood that the major portion of thin film surface layer 36 infiltrates substrate 36 filling the surface pores thereof. Additionally, the surface layer covers the fiber metals disposed at the surface of faces 38, 40 and 42. In this manner then the aluminum silicone forms a thin film surface layer.

With aluminum silicone surface layer 36 applied to substrate 34 as described, the face seal 22 is installed in the gas turbine engine. When the gas turbine engine is first operated, the increasing temperatures and speeds associated with engine operation, cause expansion of the engine components and hence teeth 30 form a plurality of grooves 44 in face seal 22 as best observed in FIG. 3. Grooves 44 will be formed in face seal 22 while aluminum silicone surface layer 36 is in its first chemical state since grooves 44 are formed in response to the initial thermal transient conditions during the initial engine run and before the face seal 22 is exposed to an appropriate engine temperature for the sufficient duration of time to alter the aforementioned first chemical state of aluminum silicone surface layer 36. Formation of grooves 44 while surface layer 36 is in its first chemical state results in very little or no wear to teeth 30.

A surface layer 36 comprised of a silicone based resin is particularly well suited for extended use in the high temperature environment of a gas turbine engine. Many other organic materials, while having acceptable wear inducing properties at lower temperatures, are not compatible with the high temperature environment which may be within the range of 600° F. to 1000° F. at the location of the seal. These other materials will oxidize into CO, $CO_2$, and $H_2O$ and otherwise disintegrate. However, the thin film surface layer 36 comprised of silicone based resin will not disintegrate with high temperature but will oxidize to a second stable state. More specifically, as the gas turbine engine accumulates additional running time after grooves 42 are formed in face seal 22, the additional time at high temperature chemically oxidizes the aluminum silicone surface layer 36 to a second chemical state comprised of a rigid structure of silica and aluminum. Typically, transformation of surface layer 36 from its initial resilient state to its second rigid state may be achieved in response to engine temperatures at the seal 22 during normal extended operation of the engine. Exposure of the surface layer 36 to temperatures above 600° F. for a period of time in excess of 2 hours is sufficient to achieve the transformation. Transformed in such a manner, the silica structure not only does not disintegrate, but it attains a high resistance to degradation by the high temperatures associated with continued operation of the gas turbine engine. Furthermore, the erosion resistance of the surface layer 36 is not reduced by the state transformation and, while the abrasivity of the layer may be increased, wear to teeth 30 is not affected by the aforementioned transformation since grooves 42 were formed prior to the surface layer 36 attaining its rigid fired second state.

It is observed that the present invention is well adapted to achieve the aforestated objections. With the apparatus and method comprising the present invention, the interconnected porosity of the sintered fiber metal substrate 34 is ineffective to provide a fluid leakage path between zones A and B. This result obtains since thin film surface layer 36, which is impervious to the passage of fluid in both its first and second states covers all of those surfaces of substrate 34 which would otherwise be exposed to gaseous fluid in the gas turbine engine. The silicone based surface layer 36 and described herein has proven to effect little or no wear to teeth 30 and has further proven to be resistant to erosion by particles entrained in the gaseous fluid flowing through the engine. The layer 36 also exhibits high resistance to degradation by the prolonged high temperatures associated with a gas turbine engine. Hence, an effective labyrinth seal has been provided which has good sealing, wear and erosion properties and which is compatible with the high temperature environment of a gas turbine engine.

It is understood that the preferred embodiment as hereinbefore described in illustrative of one form of the present invention and that other forms are possible without departing from the scope thereof as set forth in the appended claims.

We claim:

1. A composite article for use in a seal in a gas turbine engine, said seal including a face seal adapted to cooperate with a rotating edge to prevent the passage of fluid from a first zone to a second zone in said engine, said composite article comprising:
   a substrate of sintered metallic fibers and having an apparent density within the range of 14.0% to 22.5%, said substrate including a network of interconnected pores and metallic bonds at points of contact between said fibers, said substrate further including an external face having surface pores in communication with said network; and
   a thin film barrier surface layer impervious to the passage of fluid, said layer disposed on said external face and filling said surface pores.

2. The invention as set forth in claim 1 wherein said thin film barrier surface layer is comprised of a silicone base resin.

3. A seal for preventing the flow of fluid between zones in a gas turbine engine, said seal comprising:
   a composite face seal having a porous substrate formed by sintered metallic fibers and having an apparent density within the range of 14.0% to 22.5%, said substrate further including a network of interconnected pores and an external face having surface pores in communication with said network, said composite face seal further including a thin film surface layer disposed on said substrate and filling said surface pores, said layer comprising a barrier impervious to the passage of fluid; and
   a rotating edge disposed immediately proximate to said face seal and adapted to form a groove in said face seal during engine operation.

4. The invention as set forth in claim 3 wherein said surface layer is comprised of silicone resin.

5. The invention as set forth in claim 4 wherein said surface layer is further comprised of a metallic filler.

6. The invention as set forth in claim 5 wherein said surface layer is comprised of aluminum silicone.

7. The invention as set forth in claim 3 wherein said thin film surface layer is comprised of a first chemical state and said groove is formed in said face seal by said edge during initial engine operation while said layer is in said first chemical state.

8. The invention as set forth in claim 7 wherein said surface layer transforms to a second chemical state while said engine accumulates running time.

9. The invention as set forth in claim 8 wherein said transformation occurs in response to a temperature in said engine during said accumulated running time.

10. A method of providing a seal for preventing the flow of fluid between zones in a gas turbine engine, said method comprising the steps of:
    constructing a substrate formed of sintered metallic fibers and having an apparent density within the range 14.0% to 22.5%;
    disposing a thin film surface layer on said substrate to form a composite face seal, said surface layer impervious to the passage of fluid;
    initially curing said surface layer;
    installing said face seal in said engine immediately proximate a rotating edge;
    operating the engine on an initial cycle to cause said rotating edge to form a groove in said surface layer; and
    transforming said surface layer during engine accumulated running time from a first chemical state to a second chemical state in response to an engine temperature.

11. The invention as set forth in claim 10 wherein said disposing step includes disposing a thin film surface layer comprised of a silicone based resin.

12. The invention as set forth in claim 11 wherein said transforming step includes transforming said surface layer to a second chemical state wherein said surface layer is comprised of silica.

* * * * *